(12) United States Patent
Lin et al.

(10) Patent No.: US 6,959,670 B2
(45) Date of Patent: Nov. 1, 2005

(54) ENGINE SYSTEM HAVING OPENED WATER TANK COVER

(76) Inventors: Kuo Chang Lin, P.O.Box 63-298, Taichung (TW) 406; Chau Hwe Chen, P.O.Box 63-298, Taichung (TW) 406

( * ) Notice: Subject to any disclaimer, the term of this patent is extended or adjusted under 35 U.S.C. 154(b) by 0 days.

(21) Appl. No.: 10/753,682

(22) Filed: Jan. 6, 2004

(65) Prior Publication Data

US 2004/0144341 A1 Jul. 29, 2004

Related U.S. Application Data

(63) Continuation-in-part of application No. 10/171,697, filed on Jun. 17, 2002, now abandoned.

(51) Int. Cl.[7] .................................................. F01P 3/22
(52) U.S. Cl. .................................. 123/41.21; 123/41.27
(58) Field of Search ........................ 123/41.14, 41.27, 123/41.54, 41.51

(56) References Cited

U.S. PATENT DOCUMENTS

| | | | |
|---|---|---|---|
| 1,250,912 A | 12/1917 | McCorkle | |
| 3,664,314 A * | 5/1972 | Lamkin | 123/573 |
| 4,509,464 A | 4/1985 | Hansen | 123/1 A |
| 4,515,135 A | 5/1985 | Glass | 123/557 |
| 4,594,991 A | 6/1986 | Harvey | 123/557 |
| 4,604,973 A * | 8/1986 | Hayashi | 123/41.21 |
| 4,700,664 A * | 10/1987 | Hayashi et al. | 123/41.27 |
| 4,721,071 A * | 1/1988 | Fujigaya et al. | 123/41.21 |
| 4,722,304 A * | 2/1988 | Hirano | 123/41.21 |
| 4,986,223 A | 1/1991 | Mahoney | 123/25 B |
| 5,255,636 A * | 10/1993 | Evans | 123/41.54 |
| 5,488,932 A | 2/1996 | Serafini | 123/3 |
| 5,540,190 A | 7/1996 | Rogers et al. | 123/1 A |
| 5,582,139 A | 12/1996 | Feuerman | 123/25 C |
| 6,196,165 B1 | 3/2001 | Rosen et al. | 123/25 B |
| 6,415,745 B1 | 7/2002 | Hellen et al. | 123/25 R |
| 6,578,532 B1 | 6/2003 | Rowley | 123/25 R |

* cited by examiner

*Primary Examiner*—Noah P. Kamen
*Assistant Examiner*—Jason Benton
(74) *Attorney, Agent, or Firm*—Charles E. Baxley

(57) ABSTRACT

An engine device includes a water tank coupled to an engine to supply cooling water to the engine and having a mouth disposed in the upper portion. A separator housing is coupled between the water tank and the engine to receive heated water and vapor or air from the engine, the separator housing is coupled to the mouth with a tube to supply the vapor and the air from the separator housing to the upper portion of the water tank, and then to supply the vapor and the air to the engine. A lid is engageable onto the mouth for enclosing the orifice of the mouth and includes an aperture coupled to the tube, to receive the vapor and the air from the separator housing.

1 Claim, 3 Drawing Sheets

ENGINE SYSTEM HAVING OPENED WATER TANK COVER

The present invention is a continuation-in-part of U.S. patent application Ser. No. 10/171,697, filed 17 Jun. 2002 now abandoned, pending, to be abandoned.

BACKGROUND OF THE INVENTION

1. Field of the Invention

The present invention relates to an engine system, and more particularly to an engine system including a water tank having an opened lid for easily coupling and supplying vapor or air to the engine.

2. Description of the Prior Art

Various kinds of typical engine systems, such as automotive internal combustion engines or the like, have been developed and widely used today, and are required to furnish gaseous fuel and air into the combustion chambers.

For example, U.S. Pat. No. 1,250,912 to McCorkle discloses one of the typical gas engine systems having a radiator coupled to a cooling system. However, the cooling system may not provide air or vapor into the engines.

U.S. Pat. No. 4,509,464 to Hansen discloses a typical high efficiency internal combustion steam engine including a vapor generator having a container for receiving or storing liquid coolant therein, and a conduit coupling the container to an intake manifold of the engine, to supply vapor into the engine. However, the conduit and one or more coupling hoses are required to be solidly secured to the vapor generator, and may not be disengaged from the vapor generator.

U.S. Pat. No. 4,515,135 to Glass discloses a conventional hot fuel gas generator for internal combustion engines and including an elongated hollow body having a number of tubes disposed therein for receiving hot exhaust gases from the internal combustion engine and for allowing the hot exhaust gases to flow out of the elongated hollow body. However, similarly, the tubes are also solidly secured to the elongated hollow body, and may not be disengaged from the elongated hollow body.

U.S. Pat. No. 4,594,991 to Harvey discloses a conventional fuel and water vaporizer for internal combustion engines and including an engine fuel pump for delivering gasoline with pipe lines. However, similarly, the pipe lines are also solidly secured to the engine fuel pump, and may not be disengaged from the engine fuel pump.

U.S. Pat. No. 4,986,223 to Mahoney discloses a conventional internal combustion engine including one or more water tanks coupled to an engine with pipes. However, similarly, the pipes are also solidly secured to the water tanks, and may not be disengaged from the water tanks.

U.S. Pat. No. 5,488,932 to Serafini discloses a conventional gaseous fuel enriching subsystem for an internal combustion engine including one or more water tanks coupled to an engine with conduits. However, similarly, the conduits are also solidly secured to the water tanks, and may not be disengaged from the water tanks.

U.S. Pat. No. 5,540,190 to Rogers et al. discloses a conventional gas hydrate storage system for an automotive vehicle, and including a hydrate storage tank having an insulated casing and one or more manifolds engaged therein. However, similarly, the manifolds are also solidly secured to the hydrate storage tanks, and may not be disengaged from the hydrate storage tanks.

U.S. Pat. No. 5,582,139 to Feuerman discloses a conventional fuel injector for a gaseous fuel supply and including a fuel tank coupled to an engine with conduits. However, similarly, the conduits are also solidly secured to the water tanks, and may not be disengaged from the water tanks.

U.S. Pat. No. 6,196,165 to Rosen et al. discloses a conventional device for supplying vapor to the intake air of an internal combustion engine and having a moistening means coupled to a tank with a heat exchanger and with conduits. However, similarly, the conduits have not been taught and may not be disengaged from the tanks.

U.S. Pat. No. 6,415,745 to Hellen et al. discloses a conventional method of reducing nitrogen oxide emissions of piston engine, and failed to disclose a water tank having an opened lid for coupling to a container or the like to receive vapor or air or gas therefrom.

U.S. Pat. No. 6,578,532 to Rowley discloses a fuel vaporizing and mixing system including a water holding tank for supplying water to a molecule mixture box with a water fluid manifold. However, the water fluid manifold may not be coupled to the water holding tank to receive vapor or air or gas from the water holding tank.

The present invention has arisen to mitigate and/or obviate the afore-described disadvantages of the conventional engine systems.

SUMMARY OF THE INVENTION

The primary objective of the present invention is to provide an engine system including a water tank having a lid for easily coupling and supplying vapor or air to the engine.

In accordance with one aspect of the invention, there is provided an engine system comprising an engine, a water tank coupled to the engine to supply cooling water to the engine, the water tank including an upper portion having a mouth provided thereon, and having an orifice formed in the mouth, a separator housing coupled between the water tank and the engine to receive heated water from the engine, a portion of the heated water being evaporated into vapor and air, the separator housing including an outlet, a tube coupled between the outlet of the separator housing and the mouth, to supply the vapor and the air from the separator housing to the upper portion of the water tank via the mouth, and the upper portion of the water tank being coupled to the engine to supply the vapor and the air to the engine, and a lid engageable onto the mouth for enclosing the orifice of the mouth, the lid including an aperture formed therein and coupled to the tube, to receive the vapor and the air from the separator housing.

The lid includes a coupler secured in the aperture thereof and coupled to the tube. The coupler is secured to the lid with at least one welder.

A storage housing may further be provided and coupled between the mouth of the water tank and the engine to receive the vapor and the air from the water tank, and to supply the vapor and the air into the engine.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
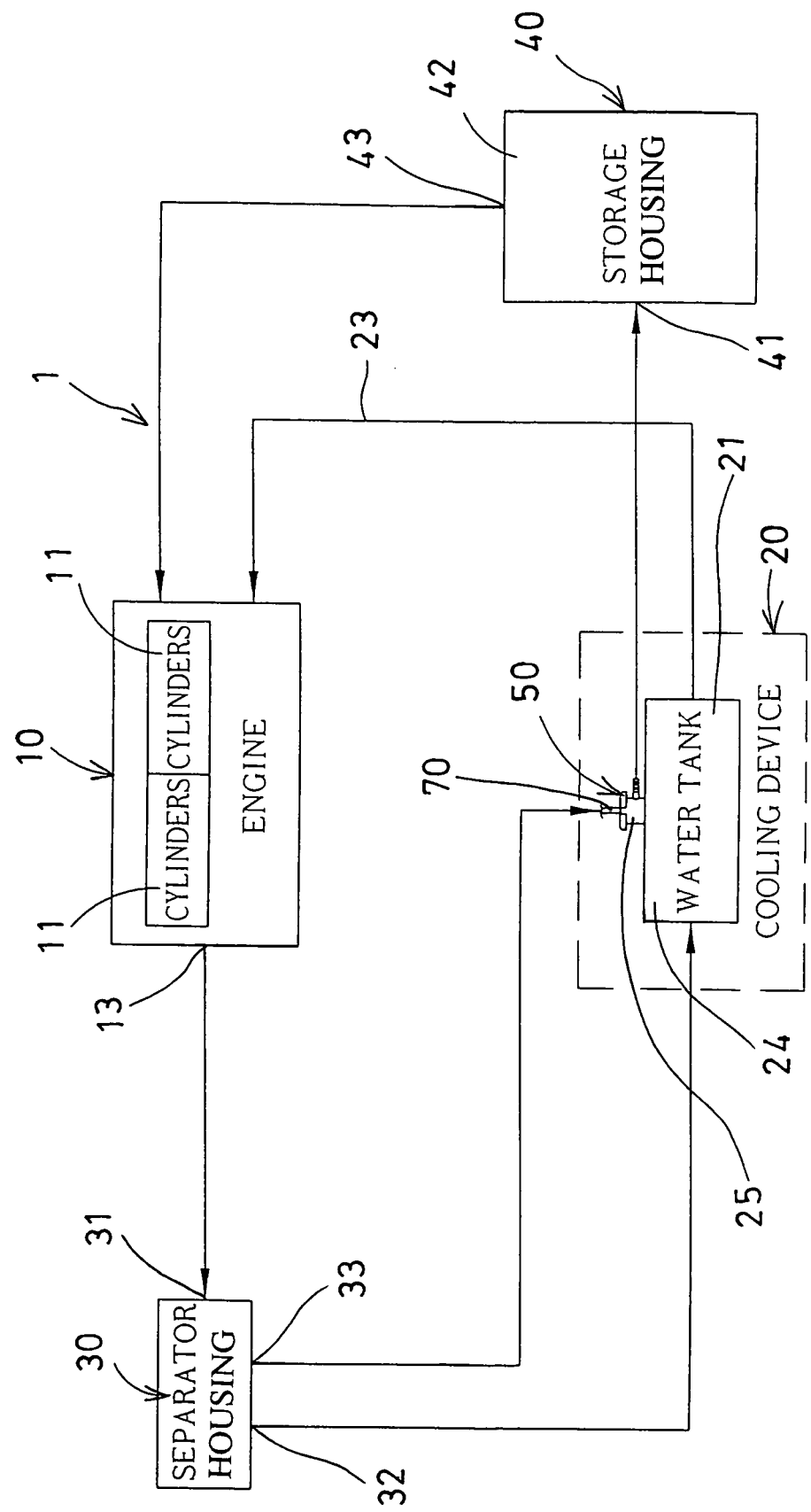
FIG. 1 is a block diagram illustrating an engine system in accordance with the present invention.

Referring to the drawings, and initially to FIG. 1, an engine system 1 in accordance with the present invention comprises an engine 10 including one or more cylinders 11 provided therein, a usual cooling device 20 including a water tank 21 coupled to the engine 10 with a tubing 23, to supply cooling water to the engine 10 and to cool the engine.

A separator housing 30 includes an inlet 31 coupled to an outlet 13 of the engine 10, to receive heated cooling water from the engine 10. After circulating through the engine 10, the cooling water will be heated by the engine 10 to a high temperature, and may have a portion evaporated into vapor or air or gas, such as hydrogen and/or oxygen or the like that will flow to the upper portion of the separator housing 30.

The separator housing 30 further includes an outlet 32 preferably coupled to the lower portion of the water tank 21, to output the liquid and heated cooling water to the water tank 21, and includes another outlet 33 coupled to such as the upper portion of the water tank 21, to output the evaporated vapor or air or gas or hydrogen and/or oxygen or the like into a mouth 25 of the water tank 21 that is communicated with an upper portion 24 of the water tank 21.

It is preferable that the inside of the water tank 21 is maintained in a high temperature that is good enough to continuously separating or evaporating the cooling water into the evaporated vapor or air or gas or hydrogen and/or oxygen or the like, for allowing much more evaporated vapor or air or gas or hydrogen and/or oxygen or the like to be generated and received in the water tank 21.

A storage housing 40 may further be provided and includes an inlet 41 coupled to the mouth 25 of the water tank 21, for receiving the evaporated vapor or air or gas or hydrogen and/or oxygen or the like from the water tank 21, and includes a chamber 42 provided therein to receive and store the evaporated vapor or air or gas or hydrogen and/or oxygen or the like.

The storage housing 40 further includes an outlet 43 coupled to the engine 10, to supply the air or hydrogen or oxygen or the like into the engine 10, in order to facilitate the combustion operation of the engine 10, and to reduce discharging carbon dioxide or other waste gas. When too much air or hydrogen or oxygen or the like is supplied into the engine 10, the engine 10 may have a good chance to be over-pressurized.

It is to be noted that, in the engine system 1 in accordance with the present invention, the supplying of the air or hydrogen or oxygen or the like into the engine 10 may facilitate the combustion of the engine 10, for allowing the fuel to be completely combusted, and such that no surplus fuel may be generated and is not required to be collected in the engine system 1 in accordance with the present invention.

Figure 2:
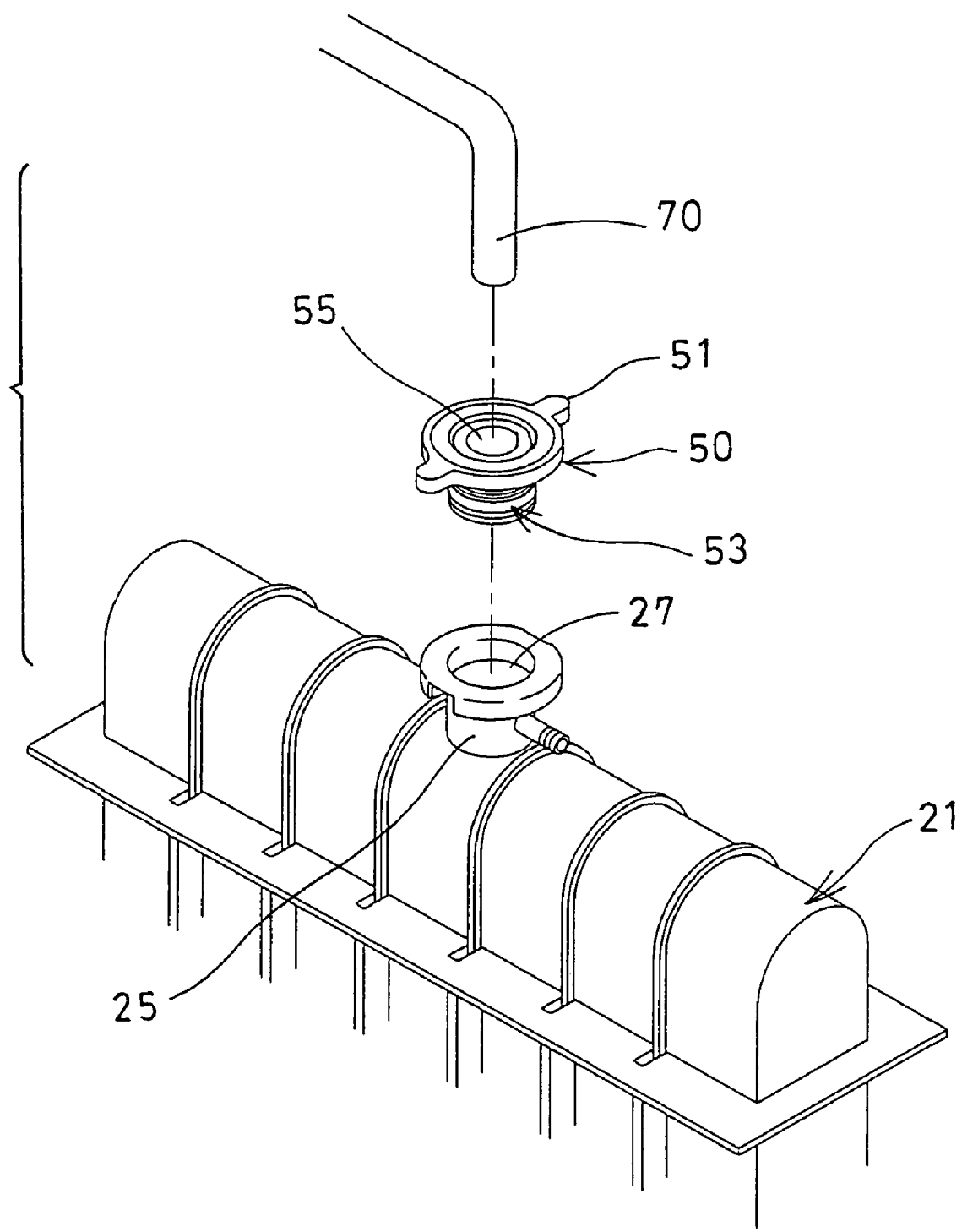
FIG. 2 is a partial exploded view illustrating a portion of a water tank and a coupling pipe for the engine system.
Figure 3:
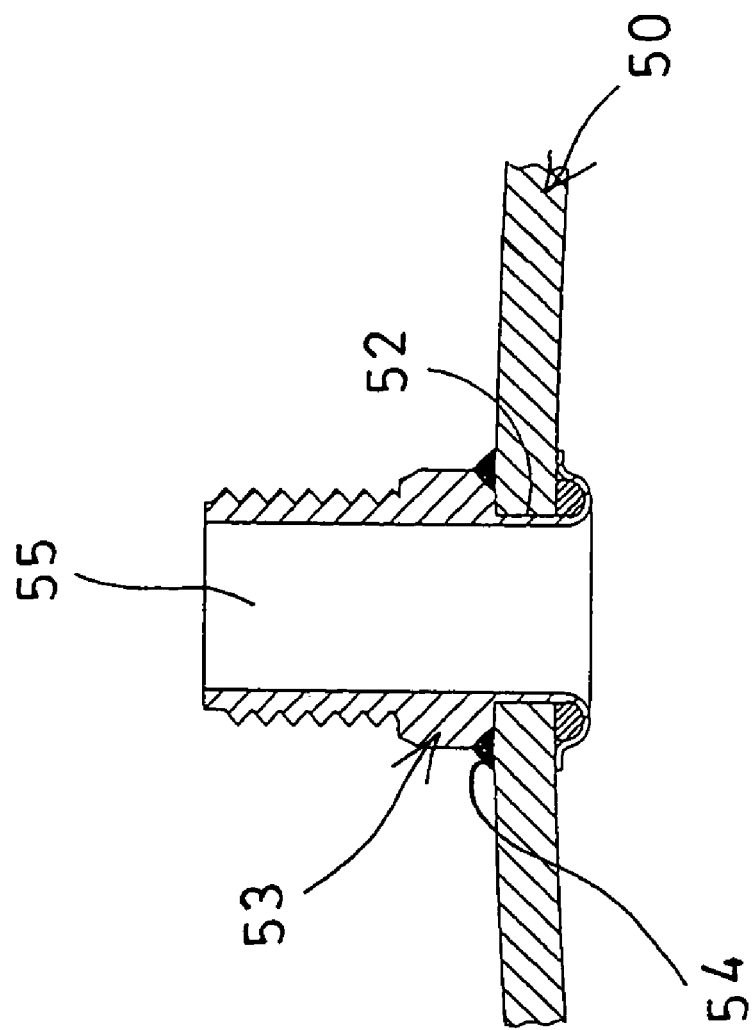
FIG. 3 is a partial cross sectional view showing a lid for the water tank of the engine system.

As shown in FIGS. 2 and 3, the water tank 21 includes an orifice 27 formed in the mouth 25 thereof, and a lid 50 to be secured to the mouth 25 with one or more usual catches 51, to enclose the orifice 27 of the mouth 25. The lid 50 includes an aperture 52 formed therein, and a conduit or a coupler 53 engaged into the aperture 52 of the lid 50 and secured to the lid 50 with one or more welders 54.

The lid 50 includes a port 55 formed therein, such as formed in the coupler 53, for coupling to a tube 70 which is coupled to the outlet 33 of the separator housing 30, to receive the evaporated vapor or air or gas or hydrogen and/or oxygen or the like therefrom. The tube 70 may also be directly coupled to the aperture 52 of the lid 50 without the coupler 53. The evaporated vapor or air or gas or hydrogen and/or oxygen or the like may also be directly supplied to the engine 10 from the mouth 25 of the water tank 21 without the storage housing 40.

It is to be noted that the lid 50 may be secured to the mouth 25 of the water tank 21 with the usual catches 51, and the tube 70 is coupled to the lid 50 to supply the evaporated vapor or air or gas or hydrogen and/or oxygen or the like from the separator housing 30 to the upper portion 24 of the water tank 21. The conventional engine systems fail to provide a lid 50 having an aperture 52 formed therein for coupling to a separator housing 30 with a tube 70 and for receiving the evaporated vapor or air or gas or hydrogen and/or oxygen or the like from the separator housing 30.

Accordingly, the engine system in accordance with the present invention including a water tank having a lid for easily coupling and supplying vapor or air to the engine.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. An engine system comprising:

an engine, a water tank coupled to said engine to supply cooling water to said engine, said water tank including an upper portion having a mouth provided thereon, and having an orifice formed in said mouth, a separator housing coupled between said water tank and said engine to receive heated water from said engine, a portion of the heated water being evaporated into vapor and air, said separator housing including an outlet, a tube coupled between said outlet of said separator housing and said mouth, to supply the vapor and the air from said separator housing to said upper portion of said water tank via said mouth, and said upper portion of said water tank being coupled to said engine to supply the vapor and the air to said engine, a lid engageable onto said mouth of said water tank for enclosing said orifice of said mouth, said lid including an aperture formed therein and coupled to said tube, to receive the vapor and the air from said separator housing, said lid including a coupler secured in said aperture thereof and coupled to said tube, and a storage housing coupled between said mouth of said water tank and said engine to receive the vapor and the air from said water tank, and to supply the vapor and the air into said engine.

* * * * *